Patented Mar. 21, 1950

2,501,551

UNITED STATES PATENT OFFICE 2,501,551

5-CYCLOHEPTENYL-5-ETHYL BARBITURIC ACID AND SALTS THEREOF

William Taub, Rehovoth, Palestine

No Drawing. Application December 23, 1947, Serial No. 793,523. In Palestine March 9, 1940

Section 1, Public Law 690, August 8, 1946
Patent expires March 9, 1960

1 Claim. (Cl. 260—257)

This invention relates to new therapeutically active substances being C-C-cycloheptenyl-ethyl barbituric acid of the formula

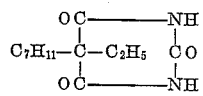

or salts thereof.

The preparation of the new compounds is analogous to that of known barbituric acid derivatives and comprises the condensation between an ester, amide, nitrile, chloride or other acid derivative of cycloheptenyl cyanoacetic or malonic acid on the one hand, and urea or a derivative or related compound, such as guanidine, thiourea, dicyandiamide or isourea ethers, or the saturated or unsaturated alkyl derivatives of such compounds, on the other hand. The ethyl group which in the final product is linked to the $C_5$-atom may be introduced into the cyanoacetic or malonic acid prior to such condensation, or into the barbituric acid resulting from the condensation.

The cycloheptenyl-ethyl-barbituric acid may be converted into its salts with inorganic or organic bases.

As compared with the known C-C-cyclohexenyl-ethyl barbituric acid, the new cycloheptenyl derivative has the great and surprising advantage of being virtually non-poisonous. The same is true for the salts. This is all the more surprising as generally in homologous series, cycloheptenyl derivatives are more poisonous than the corresponding cyclohexenyl compounds.

The following example, to which the invention is not limited, illustrates how cycloheptenyl-ethyl barbituric acid may be prepared.

112 grs. of cycloheptanone (suberone) are mixed with 130 grs. of cyanoacetic acid methyl ester, 2 grs. of piperidine are added, and the mixture is heated on the water bath at 60° C. for several hours until no more water separates from the reaction mixture. The water layer is removed, and the remainder is subjected to distillation in vacuo. The fraction distilling at 160° to 175° under a pressure of 20 mms. is collected separately; it consists of cycloheptenyl-cyanoacetic acid methyl ester. The first fractions can be subjected to a fresh condensing reaction after addition of more piperidine.

The cycloheptenyl-cyanoacetic acid methyl ester so obtained is a colorless liquid boiling at 174° C. under a pressure of 20 mms.

Into this compound, an ethyl radical is introduced at the same C-atom to which the cycloheptenyl radical is connected. This is done, for example, in the following way:

19.3 grs. of the said ester are added to a solution of 2.3 grs. of sodium in 40 cc. of absolute ethyl alcohol. To this mixture, 13.0 grs. of ethyl bromide are gradually added while cooling, and the reaction mixture is heated under reflux on a water bath until it has become neutral. The mixture is then taken up in water, the aqueous layer is separated, and the cycloheptenyl-ethyl-cyanoacetic acid methyl ester so formed distils at 169–170° C. under a pressure of 20 mms.

22.1 grs. of this latter substance are dissolved in a solution of 4.6 grs. of sodium in 100 cc. of absolute ethyl alcohol, 12 grs. of urea are further added thereto, and the whole solution is heated to about 80° C. for about eight hours. The alcohol is then distilled off in vacuo, the residue is dissolved in cold water, and from this solution, C-C-cycloheptenyl-ethyl barbituric acid is obtained by saponification with diluted hydrochloric acid. The crude product is re-crystallized from diluted ethyl alcohol and forms colorless needles of faintly bitter taste and melting point 174° C.

The sodium salt of this acid may be prepared by dissolving 2.5 grs. of the acid in a solution of 0.23 gr. of sodium in 20 cc. of ethyl alcohol, and the salt forms, after evaporating the alcohol, a colorless, water-soluble powder.

For the preparation of the corresponding calcium or magnesium salts the aforesaid acid is dissolved in an equivalent amount of aqueous N/1 sodium hydroxide solution to which a highly concentrated aqueous solution of magnesium chloride or calcium chloride is added in an amount slightly in excess over the stoichiometrically required amount. The desired salt crystallizes of its own accord and is filtered off and dried.

I claim:

As new products, 5-5-C-C-cycloheptenyl-ethyl barbituric acid of the formula

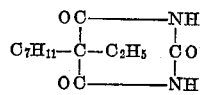

and salts thereof with bases

WILLIAM TAUB.

REFERENCES CITED

The following references are of record in the file of this patent:

FOREIGN PATENTS

| Number | Country | Date |
|---|---|---|
| 163,448 | Switzerland | Oct. 16, 1933 |